(12) United States Patent
Kang et al.

(10) Patent No.: US 10,268,277 B2
(45) Date of Patent: Apr. 23, 2019

(54) GESTURE BASED MANIPULATION OF THREE-DIMENSIONAL IMAGES

(71) Applicant: Hewlett-Packard Development Company, L.P., Houston, TX (US)

(72) Inventors: Jinman Kang, San Diego, CA (US); Ben Wynne, San Diego, CA (US); David Bradley Short, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 15 days.

(21) Appl. No.: 15/514,645

(22) PCT Filed: Sep. 30, 2014

(86) PCT No.: PCT/US2014/058429
§ 371 (c)(1),
(2) Date: Mar. 27, 2017

(87) PCT Pub. No.: WO2016/053320
PCT Pub. Date: Apr. 7, 2016

(65) Prior Publication Data
US 2017/0249015 A1    Aug. 31, 2017

(51) Int. Cl.
*G06F 3/01* (2006.01)
*G06F 3/00* (2006.01)
(Continued)

(52) U.S. Cl.
CPC .............. *G06F 3/017* (2013.01); *G06F 3/005* (2013.01); *G06F 3/04815* (2013.01); *G06T 19/20* (2013.01)

(58) Field of Classification Search
CPC ...... G06F 3/017; G06F 3/005; G06F 3/04815; G06T 19/20
See application file for complete search history.

(56) References Cited

U.S. PATENT DOCUMENTS 7,599,561 B2   10/2009   Wilson et al.
7,710,391 B2    5/2010   Bell et al.
(Continued)

FOREIGN PATENT DOCUMENTS

EP   2056185   5/2009
EP   2600184   6/2013
(Continued)

OTHER PUBLICATIONS

A. Wilson et al, "Combining Multiple Depth Cameras and Projectors for Interactions on, Above, and Between Surfaces," UIST '10, Oct. 2010, pp. 1-10, Microsoft Research.
(Continued)

*Primary Examiner* — Ricardo Osorio
(74) *Attorney, Agent, or Firm* — HP Inc. Patent Department

(57) ABSTRACT

Examples disclosed herein relate to manipulating three-dimensional image in response to user gestures. Examples include rendering three-dimensional images based on three-dimensional image data, receiving sensor data corresponding to a user gesture, and recognizing the user gesture based on the sensor data Based on the recognized user gesture and the three-dimensional image data, determining and performing a function to update the corresponding three-dimensional image data and, consequently, alter the rendered three-dimensional images. The three-dimensional image data can be generated by a sensor coupled to the same computing device used to render the three-dimensional images.

15 Claims, 7 Drawing Sheets

(51) Int. Cl.
*G06F 3/0481* (2013.01)
*G06T 19/20* (2011.01)

(56) References Cited

U.S. PATENT DOCUMENTS

| | | | |
|---|---|---|---|
| 7,881,901 | B2 | 2/2011 | Fein et al. |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 9,753,126 | B2* | 9/2017 | Smits ................ G01S 17/003 |
| 9,762,757 | B2* | 9/2017 | Kim ................ H04N 1/00307 |
| 9,933,933 | B2* | 4/2018 | Han ................ G06F 3/0488 |
| 2005/0078092 | A1 | 4/2005 | Clapper |
| 2008/0018591 | A1 | 1/2008 | Pittel et al. |
| 2009/0077504 | A1 | 3/2009 | Bell et al. |
| 2011/0242054 | A1 | 10/2011 | Tsu |
| 2012/0005624 | A1 | 1/2012 | Vesely |
| 2012/0017147 | A1* | 1/2012 | Mark ................ G06F 1/1639 715/702 |
| 2012/0056804 | A1 | 3/2012 | Radivojevic et al. |
| 2012/0223909 | A1 | 9/2012 | Tse et al. |
| 2012/0293411 | A1 | 11/2012 | Leithinger et al. |
| 2012/0313848 | A1 | 12/2012 | Galor et al. |
| 2013/0009861 | A1* | 1/2013 | Valik ................ G06F 3/017 345/156 |
| 2013/0038528 | A1 | 2/2013 | Fein et al. |
| 2013/0077236 | A1 | 3/2013 | Becze et al. |
| 2013/0207962 | A1 | 8/2013 | Oberdorfer et al. |
| 2013/0229396 | A1 | 9/2013 | Huebner |
| 2014/0089866 | A1 | 3/2014 | Mongia et al. |
| 2014/0129990 | A1 | 5/2014 | Xin et al. |
| 2014/0253692 | A1 | 9/2014 | Wilson et al. |

FOREIGN PATENT DOCUMENTS

| | | |
|---|---|---|
| WO | WO-2010/144050 A1 | 12/2010 |
| WO | WO-2013019255 | 2/2013 |
| WO | WO-2014/010251 A1 | 1/2014 |

OTHER PUBLICATIONS

Ku et al, "A Study on the Natural Manipulation of Multi-touch Gestures for 3D Object Rotation Using a Large Touch Screen," Apr. 18, 2014, 1-10, ud2014.se/wp-content/.

Shahram Izadi et al., "C-Slate: A Multi-Touch and Object Recognition System for Remote Collaboration using Horizontal Surfaces," 2007, pp. 3-10, IEEE.

* cited by examiner

GESTURE BASED MANIPULATION OF THREE-DIMENSIONAL IMAGES

BACKGROUND

Many computing systems include at least one display and at least one input device. The display may include, for example, a monitor, a screen, or the like. Example input devices include a mouse, a keyboard, a touchpad, or the like. Some computing systems include a touch-sensitive display to both display output of the computing system and receive physical (e.g., touch) input.

BRIEF DESCRIPTION OF THE DRAWINGS

The following detailed description references the drawings, wherein.

DETAILED DESCRIPTION

Figure 1:
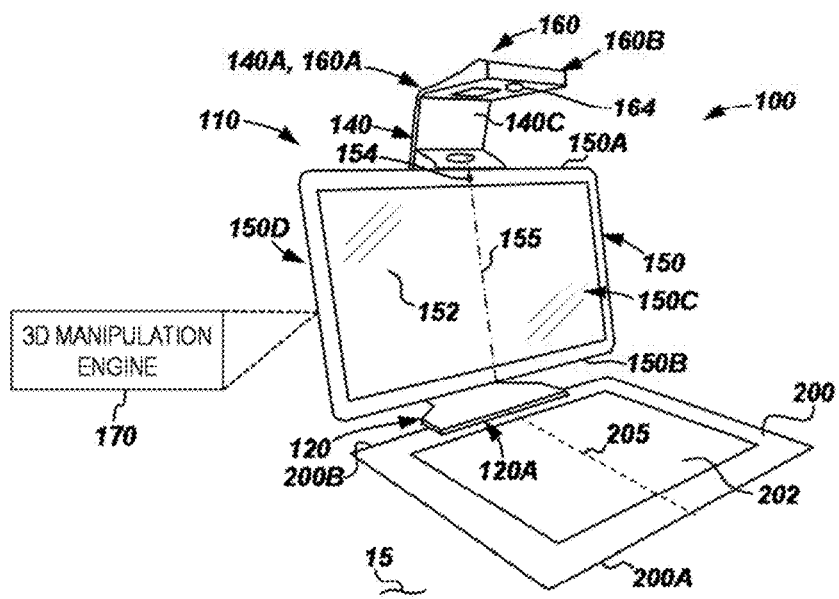
FIG. 1 is a schematic perspective view of an example computing system comprising a three-dimensional (3D) manipulation engine.

In a computing system that includes functionality for capturing and displaying three-dimensional (3D) information, the ability of a user to interact with or manipulation the rendered images of three dimensional objects can be limited by traditional user input devices. Keyboards, mice, styli, and other types of mechanical user input devices are awkward and ineffective for selecting, manipulating, and moving 3D images that appear to the user to occupy a 3D space. For example, in a computer system, as described herein, that can project an image on a surface so that it appears to occupy a particular 3D region in front of the computing device can be limited by traditional user input device. Use of a keyboard or a mouse locked in a two-dimensional (2D) plane can make it difficult to select, let alone move, rotate, or augment, virtual objects that occupy a location in the 3D region.

Techniques to bridge the operational gap between traditional user interface device and 3D domains, use various supplemental graphic user interface controls, such as sliders, rotation points, menus, and the like, to give a user control of the location, size, magnification, orientation, etc, of rendered 3D objects, However, such techniques can not only result in an overly complex and confusing user interface, but are also often counter-intuitive to use. Accordingly, to improve user experience and to make manipulation of 3D images and the underlying 3D image data more effective, examples of the present disclosure include techniques for devices and methods for detecting user gestures in the projection region that indicate various functions that can be used to change the rendered 3D images and well as the underlying data Such gestures for interacting with rendered 3D images can include movements that come naturally to users because they are similar to the manner in which a user would intuitively touch or manipulate a physical object. In example implementations of the present disclosure, gestures that mimic actions, such as grabbing, pushing, turning, and the like, that a user might use to manipulate a physical object, can also be used to manipulate a rendered 3D image of the object.

In some example implementations, functions can be associated with a recognized gesture and applied to a 3D image of an object based on the gesture's detected proximity to the image's apparent location in space, or at least the 3D region in which the 3D image is projected or otherwise appears to be displayed. For instance, the 3D image of a certain object can be associated with a particular location in the underlying data. When a particular gesture is detected in that particular location in the projection or display region, the function associated with that gesture can be applied to the 3D image of that object (e.g., a pointing motion at or near the 3D rendering of a ball will indicate that the user wishes initiate a selection function to select the 3D image of the ball and/or the underlying 3D image data for that bail). The gesture and the resulting function may not be applied to 3D images not associated with the location in which the gesture is recognized, in various examples described herein, the recognition of gestures and the association of those gestures with location, 3D images, and indicated functions can be handled by a 3D manipulation engine implemented as any combination of software and hardware in various types of computing systems.

Referring now to the drawings, FIGS. 1-7 are schematic views of an example computing system 100 comprising a 3D manipulation engine 170. In the example of FIGS. 1-7, system 100 generally comprises a support structure 110, a computing device 150, a projector assembly 184, and a touch-sensitive surface 200. Computing device 150 may include 3D manipulation engine 170 to determine manipulation functions on a 3D image rendered by the projector assembly 184 in response to gestures detected by sensors in the sensor bundle 184 and 3D image data corresponding to the 3D image, as described above.

Computing device 150 may comprise any suitable computing device complying with the principles disclosed herein. As used herein, a "computing device" may comprise an electronic display device, a smartphone, a tablet, a chip set, an all-in-one computer (e.g., a device comprising a display device that also houses processing resource(s) of the computer), a desktop computer, a notebook computer, workstation, server, any other processing device or equipment, or a combination thereof. In this example, device 150 is an all-in-one computer having a central axis or center line 155, first or top side 150A, a second or bottom side 150B axially opposite the top side 150A, a front side 150C extending axially between sides 150A and 150B, a rear side 150D also extending axially between sides 150A and 150B and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
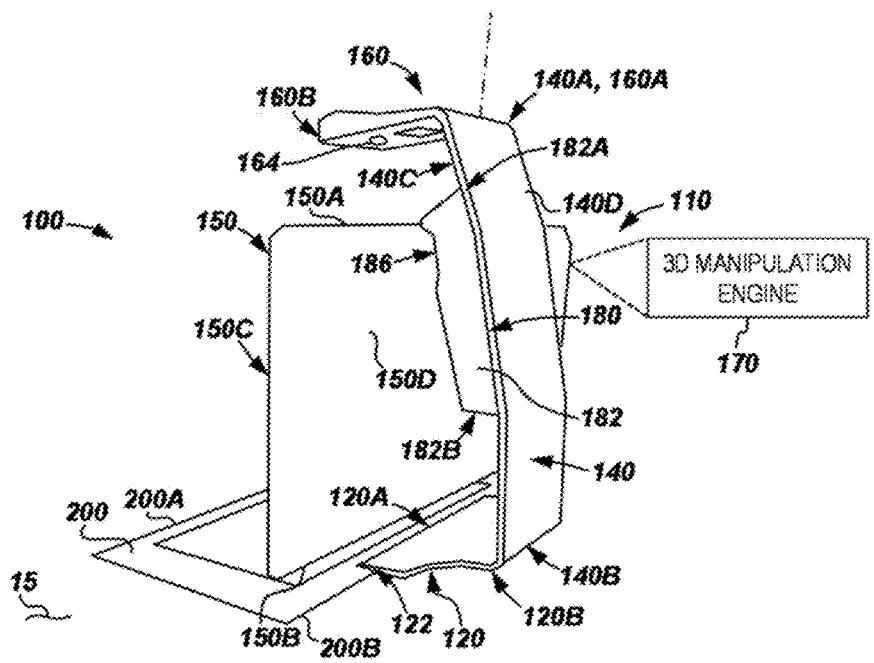
FIG. 2 is another schematic perspective view of the example computing system of FIG. 1.

In the example of FIGS. 1-7, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, projector unit 180, device 150, top 160, etc.). In some examples, base 120 may engage with support surface 15 in this manner when system 100 is configured for operation. In the example of FIGS. 1-7, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of touch-sensitive surface 200 may be disposed in (e.g., received within) the space formed between portion 122 and surface 15. In such examples, placing a portion of surface 200 within the space created by portion 122 and surface 15 may assist with the proper alignment of surface 200. In other examples, other suitable methods or devices may be used to assist with the alignment of surface 200.

Upright member 140 includes a first or upper end 140A, a second or lower end 140B opposite the upper end 140A, a first or front side 140C extending between the ends 140A and 140B, and a second or rear side 140D opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top. In some examples, base 120, member 140, and top 160 may be monolithically formed. In other examples, two or more of base 120, member 140, and top 160 may be formed of separate pieces (i.e., not monolithically formed).

Touch-sensitive surface 200 may include a central axis or centerline 205, a first or front side 200A, and a second or rear side 200B axially opposite the front side 200A. Touch-sensitive surface 200 may comprise any suitable technology for detecting physical contact with surface 200 as touch input. For example, touch-sensitive surface 200 may comprise any suitable technology for detecting (and in some examples tracking) one or multiple touch inputs by a user to enable the user to interact, via such touch input, with software being executed by device 150 or another computing device. In examples described herein, touch-sensitive surface 200 may be any suitable touch-sensitive planar (or substantially planar) object, such as a touch-sensitive mat, tabletop, sheet, etc. In some examples, touch-sensitive surface 200 may be disposed horizontal (or approximately or substantially horizontal). For example, surface 200 may be disposed on support surface 15, which may be horizontal (or approximately or substantially horizontal).

In some examples, all or substantially all of surface 200 may be capable of detecting touch input as described above. In other examples, less than all of surface 200 may be capable of detecting touch input as described above. For example, surface 200 may comprise a touch-sensitive region 202, extending over less than all of surface 200, wherein region 202 is capable of detecting touch input as described above. In other examples, region 202 may extend over substantially all of surface 200 (e.g., may be substantially coterminous with surface 200). Region 202 may be substantially aligned with axis 205.

As described above, surface 200 may be aligned with base 120 of structure 110 to assist with proper alignment of surface 200 (e.g., at least during operation of system 100). In the example of FIGS. 1-7, rear side 200B of surface 200 may be disposed between raised portion 122 of base 120 and support surface 15, such that rear end 200B is aligned with front side 120A of base 120 to assist with proper overall alignment of surface 200 (and particularly proper alignment of region 202) with other components of system 100. In some examples, surface 200 may be aligned with device 150 such that the center line 155 of device 150 is substantially aligned with center line 205 of surface 200. In other examples, surface 200 may be differently aligned with device 150.

In some examples, surface 200 and device 150 may be communicatively connected (e.g., electrically coupled) to one another such that user inputs received by surface 200 may be communicated to device 150. Surface 200 and device 150 may communicate with one another via any suitable wired or wireless communication technology or mechanism, such as, for example, WI-FI, BLUETOOTH, ultrasonic technology, electrical cables, electrical leads, electrical conductors, electrical spring-loaded pogo pins with magnetic holding force, or the like, or a combination thereof. In the example of FIGS. 1-7, exposed electrical contacts disposed on rear side 200B of surface 200 may engage with corresponding electrical pogo-pin leads within portion 122 of base 120 to communicate information (e.g., transfer signals) between device 150 and surface 200 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of surface 200.

Figure 3:
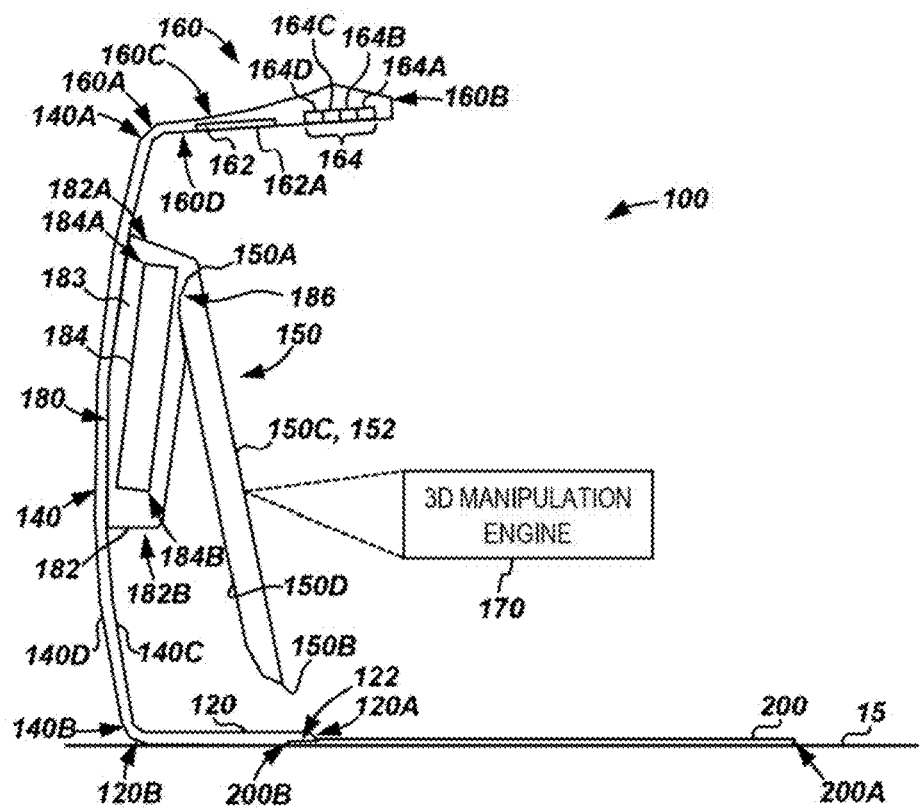
FIG. 3 is a schematic side view of the example computing system of FIG. 1.

Referring to FIG. 3, projector unit 180 comprises an outer housing 182, and a projector assembly 184 disposed within housing 182. Housing 182 includes a first or upper end 182A, a second or lower end 182B opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of projector unit 180. In some examples, housing 180 and device 150 may be integrally or monolithically formed as a single unit.

Figure 4:
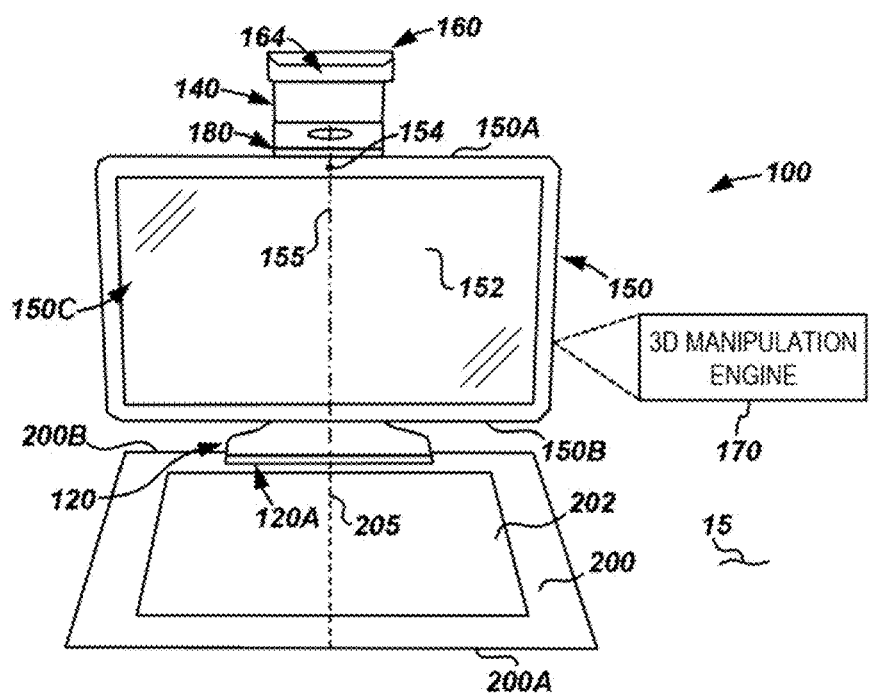
FIG. 4 is a schematic front view of the example computing system of FIG. 1.

Referring to FIG. 4, in some examples, when device 150 is suspended from structure 110 via mounting, member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 is disposed within cavity 183 of housing 182, and includes a first or upper end 184A, a second or lower end 184B opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting 2D and/or 3D image(s) (e.g., out of upper end 184A). For example, in some implementations, projector assembly 184 may comprise one or more digital light processing (DLP) projectors or a liquid crystal on silicon (LCoS) projectors which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio.

In examples in which the <projector assembly 184 is capable of rendering 3D images onto the touch sensitive surface 200 or the display device 152 is capable of rendering 3D images, a user may view the rendered 3D images with or without the aid of corresponding optical filters or devices (e.g., 3D glasses or goggles). While rendering the 3D images, the device 150 can track the location and orientation of the depicted objects in the 3D image. In some examples, the device 150 can maintain updated 3D image data for each individual or composite object in the 3D image. In such implementations, each object or figure in a 3D image (e.g., a ball, a box, a tree, a person, etc.) can be rendered from a corresponding set of 3D image data. In other implementations, the device 150 can maintain a single set of 3D image data that corresponds to everything in the 3D image (e.g., objects in the foreground, the background, user interface controls, and active objects). Maintaining the corresponding 3D image data can include making changes to the 3D image data in response to user input that moves, rotates, or otherwise changes the size, orientation, configuration, location, or other characteristic of the objects depicted in the 3D image.

In some examples, user input can be received through the touch-sensitive surface 200, a mouse, stylus, or the sensor bundle 164. The user input can indicate changes in location, orientation, rotation, size, skew, shape, and the like, to the objects in the 3D image. Various implementations of the present disclosure include functionality to detect hand and/ or finger gestures in the region between the touch-sensitive surface 200 and the sensor bundle 164 that indicate desired changes to the 3D image. Such implementations provide a user interface that is intuitive and natural for quickly and efficiency interacting with and controlling 3D images of objects.

In some examples, to view the rendered 3D images, a user can use a pair bf glasses that correspond to the type of 3D projection used by the projector assembly 164 to render the 3D images. For example, for 3D methods that use alternating or simultaneous projection of polarized light, the 3D glasses can include appropriately linearly or circularly polarized filters. Such 3D glasses can be passive. Alternatively, in systems that alternately project the right and left perspective images as a function of time, the 3D glasses can synchronously block the view from one eye or the other according to the image being rendered at that particular time. Such 3D glasses are typically active and require a power source to alternate which eye is allowed to see at a particular time and to sync with the device 150.

Projector assembly 184 is further communicatively connected (e.g., electrically coupled) to device 150 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, an ultrasonic connection, or a combination thereof. In the example of FIGS. 1-7, device 150 is communicatively connected to assembly 184 through electrical leads or conductors (e.g., as described above in relation to surface 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164, Mirror 162 includes a highly reflective surface 162A that is disposed along bottom surface 160D of top 160 and is positioned to reflect light, image(s), etc., projected from upper end 184A of projector assembly 184 toward surface 200 during operation. Mirror 162 may comprise any suitable type of mirror or reflective surface. In the example of FIGS. 1-7, fold mirror 162 may comprise a standard front surface vacuum metalized aluminum coated glass mirror that acts to fold light emitted from assembly 184 down to surface 200. In other examples, mirror 162 may have a complex aspherical curvature to act as a reflective lens element to provide additional focusing power or optical correction.

Sensor bundle 164 includes at least one sensor (e.g., camera, or other type of sensor) to detect, measure, or otherwise acquire data based on the state of (e.g., activities occurring in) a region between sensor bundle 164 and surface 200. The state of the region between sensor bundle 164 and surface 200 may include object(s) on or over surface 200, or activities) occurring on or near surface 200. In the example of FIG. 3, bundle 164 includes a red-green-blue (RGB) camera 164A (or another type of color camera 164A), an IR camera 164B, a depth camera (or depth sensor) 164C, and an ambient light sensor 164D. In examples described herein, a camera may be referred to as a "sensor".

In some examples, RGB camera 164A may be a camera to capture color images (e.g., at least one of still images and video). In some examples, RSB camera 164A may be a camera to capture images according to the RGB color model, which may be referred to herein as "RGB images". In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RBG camera 164A may capture images with a different resolution. In some examples, RGB camera 164A may be pointed toward surface 200 and may capture image(s) of surface 200, object(s) disposed between surface 200 and RGB camera 164A (e.g., on or above surface 200), or a combination thereof.

IR camera 164B may be a camera to detect intensity of IR light at a plurality of points in the field of view of the camera 164B. In examples described herein, IR camera 164B may operate in conjunction with an IR light projector 166 (see FIG. 7) of system 100 to capture IR images. In such examples, each IR image may comprise a plurality of pixels each representing an intensity of IR light detected at a point represented by the pixel, In some examples, top 160 of system 100 may include an IR light projector 166 (see FIG. 7) to project IR light 167 toward surface 200 and IR camera 164B may be pointed toward surface 200. In such examples, IR camera 164B may detect the intensity of IR light reflected by surface 200, object(s) disposed between surface 200 and IR camera 164B (e.g., on or above surface 200), or a combination thereof. In some examples, IR camera 164B may exclusively detect IR light 167 projected by IR light projector 166 (e.g., as reflected from surface 200, object(s), etc., or received directly).

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164C) of a portion of an object at a point represented by the pixel. Depth camera 164C may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when an object (e.g., a 3D object) is on surface 200. In some examples, depth sensor 164C may detect at least one of the presence, shape, contours, motion, and the respective distance(s) of an object (or portions thereof) placed on surface 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface, sensor may include a pair of cameras which are arranged to stereoscopically track the location of a user input device (e.g., a stylus) as it is moved by a user about the surface 200 (e.g., about region 202 of surface 200). In other examples, the user interface sensor may additionally or alternatively include IR camera(s) or sensor(s) arranged to detect infrared light that is either emitted or reflected by a user input device. In some examples, sensor bundle 164 may include a gesture camera to detect the performance of predefined gestures by object(s) (e.g., hands, etc.). In some examples, the gesture camera may comprise a depth camera and additional functionality to detect, track, etc., the distance or location of different types of motion over time relative to the sensor bundle 164.

In examples described herein, each of sensors 164A-164D of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-7, electrical conductors may be routed from bundle 164, through top 160, upright member 140, and projector unit 180 and into device 150 through leads that are disposed within mounting member 186 (as described above).

Figure 5:
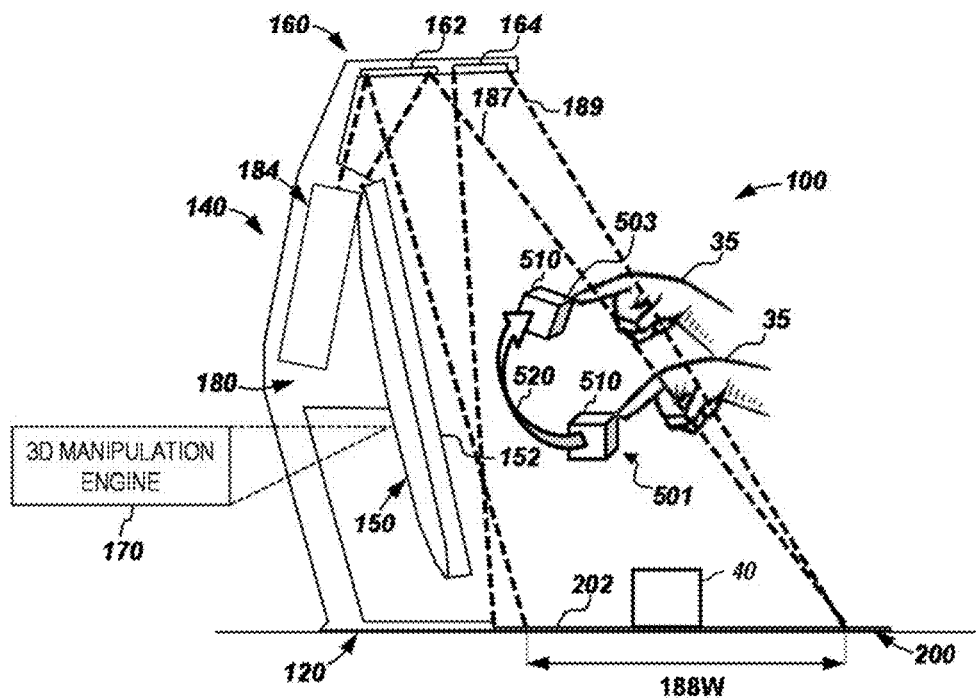
FIG. 5 is a schematic side view of the example computing system of FIG. 1 during an example operation.
Figure 6:
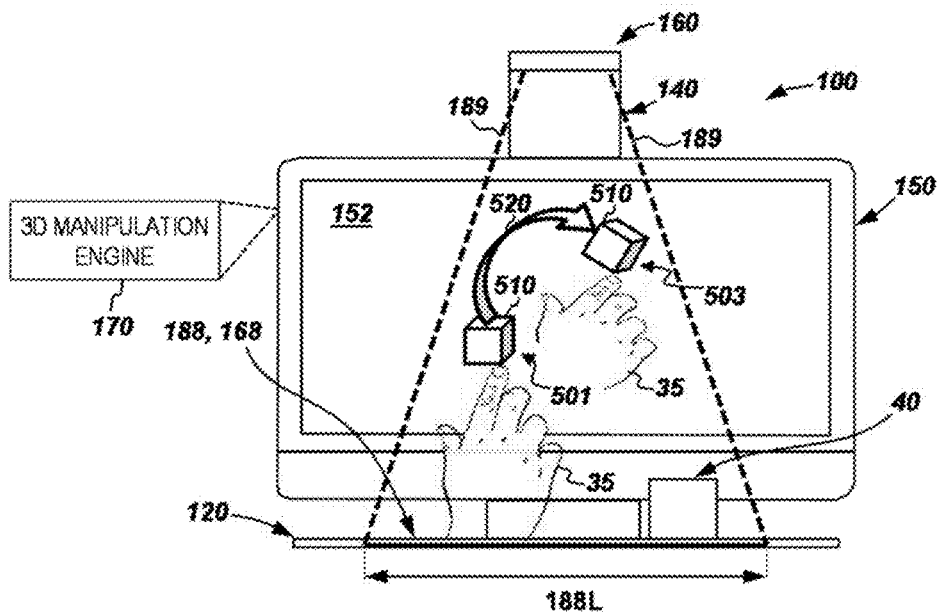
FIG. 6 is a schematic front view of the example computing system of FIG. 1 during another example operation.

Referring to FIGS. 5 and 6, during operation of system 100, projector assembly 184 may project visible light 187 to reflect off of mirror 162 towards surface 200 to thereby display visible 2D and 3D image(s) on a projector display space 188 of surface 200. In the example of FIGS. 5-6, space 188 may be substantially rectangular, having a length 188L and a width 188W. In some examples, length 188L may be approximately 16 inches, while width 188W may be approximately 12 inches. In other examples, length 188L and width 188W may have different values.

Figure 7:
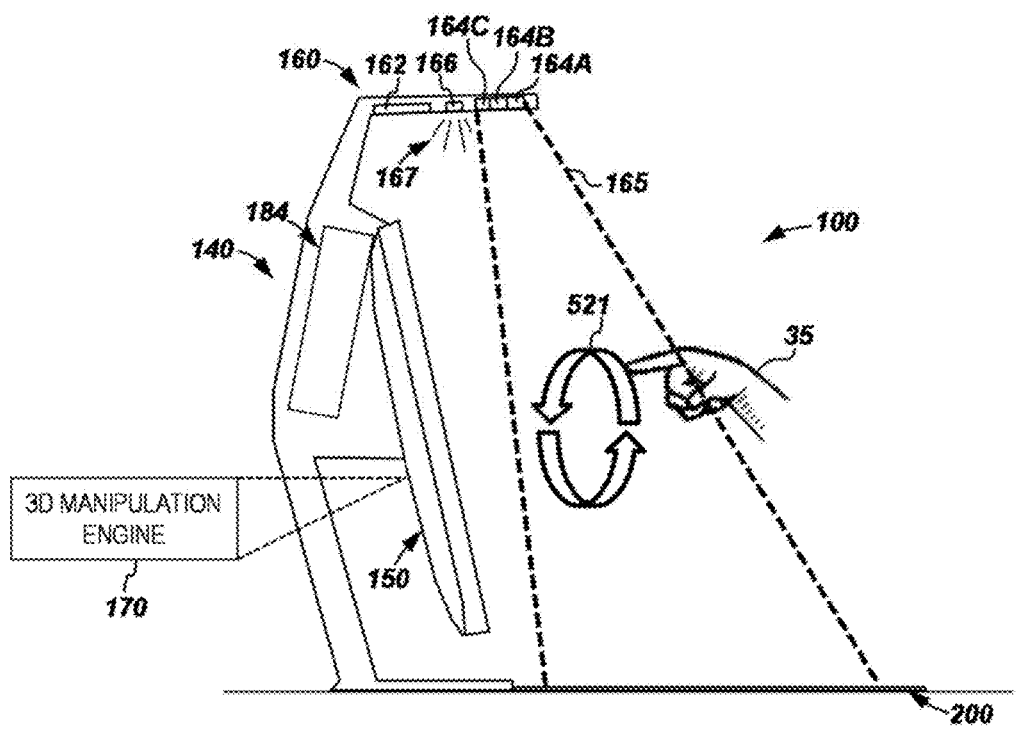
FIG. 7 is a schematic side view of the example computing system of FIG. 1 during another example operation.

In some examples, cameras of sensor bundle 164 (e.g., cameras 164A-164C) are arranged within system 100 such that the field of view of each of the cameras includes a space 168 of surface 200 that may overlap with some or all of display space 188, or may be coterminous with display space 188. In examples described herein, the field of view of the cameras of sensor bundle 164 (e.g., cameras 164A-164C) may be said to include space 168, though at times surface 200 may be at least partially occluded by object(s) on or over surface 200. In such examples, the object(s) on or over surface 200 may be in the field of view of at least one of cameras 164A-164C. In such examples, sensors of sensor bundle 164 may acquire data based on the state of (e.g., activities occurring in, object(s) disposed in) a region between sensor bundle 164 and space 168 of surface 200. In some examples, both space 188 and space 168 coincide or correspond with region 202 of surface 200 such that functionalities of touch-sensitive region 202, projector assembly 184, and sensor bundle 164 are all performed in relation to the same defined area. A field of view 166 of the cameras of sensor bundle 164 (e.g., cameras 164A-164C) is schematically illustrated in FIG. 7. In some examples, each of the cameras of sensor bundle 164 (e.g., cameras 164A-164C) may have a slightly different field of view.

In reference to FIGS. 5,7, device 150 may direct projector assembly 184 to project image(s) onto surface 200 (e.g., onto region 202). Device 150 may also display image(s) on display 152 (which may be the same as or different than the image(s) projected onto region 202 by projector assembly 184). The image(s) projected by assembly 184 may comprise information and/or images produced by software being executed by device 150. In some examples, a user may interact with the image(s) projected on surface 200 and displayed on display 152 by physically engaging touch-sensitive surface 200 in any suitable manner, such as with user's hand 35 (e.g., via touches, taps, gestures, or other touch input), with a stylus, or via any other suitable user input device(s). As described above, touch-sensitive surface 200 may detect such interaction via physical engagement with surface 200. Also, in some examples, assembly 184 may also project image(s) (at least partially) on objects disposed over surface 200 (e.g., hand 35, as shown in FIG. 5). In other examples, a user may interact with the image(s) projected on surface 200 and displayed on display 152 by making one or two handed gestures within the field of view of the cameras in the sensor bundle 164. In such examples, one or more of the cameras in the sensor bundle may image the objection and relative 3D locations and/or configuration (e.g., finger pointing, palm up vs. palm down, etc.) of a user's hand or hands over time. As used herein, the term "hand" can refer to any object with which a user can make gestures. For instance, a hand may include a pointer, a stylus, a prosthetic, a finger, or any other suitable limb or tool.

The device 150 can then analyze the images to identify, locate, and/or track various, elements of the hand (e.g., finger tips, back of the hand, the palm of the hand, etc.) to recognize gestures made by a user. For example, the device 150 may execute instructions that cause the 3D manipulation engine 170 instantiated on device 150 to identify and locate the position of fingertips and then recognize a pinching motion between an index-finger and a thumb gesture. Depending on what function or functions the recognized gesture is associated with, the 3D manipulation engine 170 can alter the image data of a displayed image and then instruct the projector assembly 184 to alter the rendered image corresponding to the altered image data. For example, the pinching gesture may indicate that the user would like to select a particular image of an object that is rendered in a 3D location corresponding to the 3D location of the gesture. Such an indication may be associated with a selection function that indicates that the rendered 3D object is now selected; and that any further user input is directed toward that selected object. For example, as long as the index finger and thumb are in the pinched position, the 3D manipulation engine 170 can recognize other gestures that may be associated with other context indicators (e.g., associated with the user, object, or use scenario). For example, while the pinch gesture is recognized and associated with the selected object, the 3D manipulation engine 170 can recognize a movement of the entire hand 35 to indicate that a move function should be performed to alter the image data so that the rendered image of the selected object is moved according to the movement of the hand 35 (e.g., shifted or transposed left-right or up-down, rotated, etc.). Once the pinch gesture is recognized as being released, the 3D manipulation engine 170 can associate subsequent recognized gestures as being associated with other rendered 3D images. Such illustrative implementations and others are described in more detail below in reference to FIGS. 5-7.

FIGS. 5-6 depicts one illustrative example in which 3D manipulation engine 170 recognizes gestures of hand 35 to manipulate a 3D image of an object 510 and its corresponding image data. As shown, the projector assembly 184 can project an image of object 510 (e.g., a 3D rectangular prism) on touch-sensitive surface 200, or other surface, so that it appears as a 3D image at a first location 501 within the region 187. The location of the rendered 3D object 510 scan be associated with some set of 3D coordinates (e.g., x-y-z coordinates) and or the location 501 can be defined by the image data corresponding to the image 510. Once image 510 or other images is projected, the user can place a hand 35 into the field of view of the sensors in the sensor bundle 164 define by the region 189.

As described above, one or more of the sensors in the sensor bundle 164 can detect the hand 35. Detection of the hand 35 can include generating sensor data that corresponds to the size, position, orientation, and configuration of the hand 35. In this particular example, hand 35 is shown with an index finger extended while the other fingers are curled under the thumb. Based on sensor data, the 3D manipulation engine 170 can determine that the hand 35, and, more specifically, the finger of the hand 35, is making a "pointing gesture" near object 510 at position 501. Based on the recognized pointing gesture in the vicinity of the image 510 at position 501, the 3D manipulation engine 170 can determine one or more predetermined or contextually determined functions or operators that can be performed on the image data corresponding to the object 510. As shown, when the finger of hand 35 is recognized as moving toward object 510, the 3D manipulation engine 170 can recognize a "pushing gesture" that may indicate that the user wants to push the object 510 to another location.

In the scenario shown in FIGS. 5 and 6, the 3D manipulation engine 170 can initiate functionality, such as initiating a function call to one or more other engines or modules in the device 150, to move the image of object 510 from location 501 to 503 along with the finger of hand 35 as it moves along path 520 detected by the sensors in sensor bundle 164. As shown, based on the recognized push gesture, the object 510 can also change orientation (e.g., rotation, spin, etc.) as it is moved to or while it is in position 503. For instance, when the pointing gesture of the finger is determined to be moving in a direction that might torque the tip or edge of rectangular prism object 510, then the corresponding function or operator can alter the underlying image data so that the rectangular prism object 510 rotates about one or more axes.

While FIGS. 5 and 6 illustrate gestures detected and recognized by the 3D manipulation engine 170 in reference to image data corresponding to the 3D images rendered by the projector assembly 184 or display 152. FIG. 7 depicts a scenario in which the 3D manipulation engine 170 can recognize gestures independent of the image data or in reference to 3D user interface control elements (e.g., buttons, sliders, radio buttons, etc.) that appear to be displayed in the space about the touch-sensitive surface 200. While recognizing gestures in reference to user interface control elements is similar to recognizing gestures in reference to image data, it is a specialized case.

For instance, the user interface control elements may not be altered, but certain gestures when recognized in proximity to the user interface control elements may be interpreted as indications to operate the controls. For example, the push gesture described above, when recognized in the vicinity of particular user interface button, may cause the 3D manipulation engine 170 to initiate functionality that operates the button. In another example, if the 3D manipulation engine 170 recognizes a circular motion gesture in which the finger of hand 35 moves along path 521 in the vicinity of the button or a slider bar (not shown) it may initiate certain control element specific functionality, such as reset the button or move a slider along the slider bar. In alternative scenarios, when the 3D manipulation engine 170 recognizes a circular gesture of the finger of hand 35 along path 521 in a region that is not within a threshold distance from an image of an object 510 or a user interface control element, then the 3D manipulation engine 170 may interpret the gesture to indicate that some other gesture specific functionality should be initiated. For example, the circular finger gesture along path 521 may indicate that a save function be executed or that a scan of a new 3D object should be initiated.

While only one hand 35 is depicted in FIGS. 5-7, example implementations of the present disclosure can be extended to detection and recognition of gestures that use multiple hands in contact or not with the touch-sensitive surface 200. The sensors in sensor bundle can update the sensor data in real time to track movement of hand 35 over time. The 3D manipulation engine 170 can analyze the sensor data to detect or recognize gestures made by the hand 35. When a gesture is recognized, the 3D manipulation engine 170 can initiate or execute functionality that causes the underlying image data to be changed and the resulting rendered image to be updated or altered. In some examples, the touch input information from the touch-sensitive surface 200 may be provided to 3D manipulation engine 170 (or an application or service implemented by or for the 3D manipulation engine 170) which may interpret the touch input in conjunction with sensor data and/or recognized gestures detected by one or more sensors in the sensor bundle 164, and/or pass the touch input to an operating system (OS) executing on device 150. In some examples, the OS may pass the received touch input and/or the sensor data to another application (e.g., program, etc.) executing on device 150. In response, the executing OS or application may alter image(s) projected by projector assembly 184, image(s) displayed on display 152, or a combination thereof. As used herein, an "application", "computer application", or "service" is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.).

In some examples, sensors (e.g., cameras) of sensor bundle 164 may also generate system input which may be provided to device 150 for further processing. For example, system 100 may utilize camera(s) of bundle 164 to detect at least one of the presence and location of a particular user's hand 35 or a stylus, and provide system input information representing the detected information to device 150 that may identify the user.

The provided system input information may be passed to at least one of an OS and application being executed by device 150, and may alter image(s) displayed by system 100, as described above in relation to touch input or recognized gestures associated with the identified user. For example, bundle 164 may include a pair of cameras or sensors that are arranged to perform stylus identification and stereoscopic stylus tracking (e.g., of stylus). In other examples, stylus includes a tip coated with an infrared retro-reflective coating (e.g., paint) such that tip may serve as an infrared retro-reflector. Such retro-reflective coating can include a discernable pattern or identifier that the device 150 can use to identify a user profile or set of presets that be used to recognize specific gestures and/or initiate user preferred functionality. In some examples, the sensors of the sensor bundle 164 may be used to identify the hand of a particular user by detecting user specific hand gestures, heat signatures, finger prints, etc.

In such examples, bundle 164 may include IR camera(s) (or sensor(s)), as described above, which detect IR light that is reflected off of the stylus or hand 35 to enable device 150 to track the location across region 202. In some examples, surface 200 (with image(s) projected on it by assembly 184) may serve as a second or alternative touch-sensitive display within system 100. In addition, detection of interaction with image(s) displayed on surface 200 may be enhanced through use of sensors of sensor bundle 164 as described above.

In some examples, system 100 may capture 2D image(s) or create a 3D scan of a physical object such that an image of the object may then be projected onto surface 200 for further use and manipulation thereof. For example, as shown in FIGS. 5 and 6, an object 40 may be placed on surface 200 such that sensors of bundle 164 (e.g., at least one of cameras 164A-164C) may detect at least one of the location, dimensions, and color of object 40 to enhance the 2D image(s) or create the 3D scan thereof. In such examples, the information gathered by the sensors, of bundle 164 may be provided to device 150 (e.g., an OS, application, service, etc., of device 150), as described above. The information gathered by the sensors of bundle 164 can be processed and saved as 2D or 3D image data in various open source and proprietary file formats. The saved image data can be used immediately or saved locally or remotely for future use. In some examples, the image data obtained by the sensor bundle 164 and processed by the device 150 can be used on its own or in conjunction with other data previously obtained from the sensor bundle 164 or some other source (e.g., a repository of image data on the local or remote data store). In yet other embodiments, the sensor bundle need not be used to obtain any image data. Rather, a previously saved image data file can be retrieved and loaded into to memory for the device 150.

In some examples, after receiving the image data, device 150 (e.g., the OS, application, service, etc.) may render and direct projector assembly 184 to project a 2D or 3D image 510 of object 40 onto surface 200. Object 40 may be, for example, a smartphone, a book, a document, a photo, or any other physical object. In some examples, once object(s) are scanned by sensors of bundle 164, the background of the image representing the object may be removed (e.g., via a segmentation process as described below), and the resulting image of the foreground object may be projected onto surface 200 (or shown on display 152). In such examples, images of physical objects (e.g., an object 40) may be captured, processed, and displayed on surface 200 to quickly and easily create a digital version of the physical object to allow for further manipulation thereof.

Figure 8A:
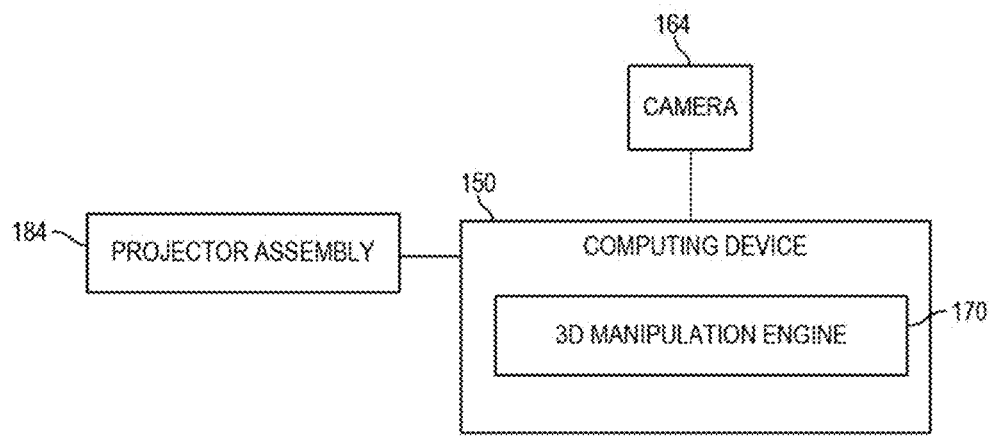
FIG. 8A is a block diagram of an example computing device to manipulate 3D images based on user gestures.

FIG. 8A is a block diagram of a portion of computing system 100 of FIG. 1 comprising 3D manipulation engine 170. In particular, FIG. 8A illustrates an example of computing device 150 that comprises 3D manipulation engine 170 and is communicatively connected to at least one camera (e.g., camera 164A) of sensor bundle 164 (as described above), and the projector assembly 184, as described above. Although not shown in FIG. 8A, computing device 150 may also be communicatively connected to other components of system 100 described above.

Computing device 150 (or any other computing device implementing 3D manipulation engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

As noted above, in the example of FIG. 8A, computing device 150 comprises 3D manipulation engine 170. In other examples, 3D manipulation engine 170 may comprise additional engine(s). In the example of FIG. 88, for example, 3D manipulation engine 170 comprises a 3D image data analysis engine 172 and a sensor data analysis engine 174. In some examples, 3D manipulation engine 170 may include additional engine(s) not shown in FIG. 8B. Computing device 150 that includes 3D manipulation engine 170 may also be communicatively connected to touch-sensitive surface 200.

In examples described herein, any engine(s) of computing device 150 (e.g., engines 170, 172, 174, etc.) may be any combination of hardware and programming to implement the respective functionalities. Such combinations of hardware and programming may be implemented in a number of different ways. For example, the programming may be processor executable instructions stored on a non-transitory machine-readable storage medium and the hardware may include a processing, source to execute those instructions. In such examples, the machine-readable storage medium may store instructions that, when executed by the processing resource, implement the engines. The machine-readable storage medium storing the instructions may be integrated in the same computing device (e.g., device 150) as the processing resource to execute the instructions, or the machine-readable storage medium may be separate from but accessible to the computing device and the processing resource. The processing resource may comprise one processor or multiple processors included in a single computing device or distributed across multiple computing devices.

In some examples, the instructions can be part of an installation package that, when installed, can be executed by the processing resource to implement the engines of system 100. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

Examples of computing system 100 comprises touch-sensitive surface 200 to detect touch input at locations of touch-sensitive surface 200, as described above. As used herein, a "touch input" may be at least one physical contact (or other physical interaction) between a touch-sensitive surface and an object (e.g., a finger, stylus, etc.) that may be detected by the surface. The touch input may be provided by physical contact between a hand 35 and surface 200. In other examples, the touch input maybe provided by contact by any other suitable object 35.

As described above, computing, system 100 may comprise sensor bundle 164 including at least one camera pointed at touch-sensitive surface 200. In the example of FIG. 7, computing device 100 can include RGB camera 164A (e.g., RGB camera 164A) pointed at surface 200. Camera 164A may capture an image representing an object 35 (e.g., a hand) disposed between camera 164A and touch-sensitive surface 200 that is, within the field of view 165 of the camera 164A.

In the example of FIGS. 5-7, 3D manipulation engine 170 may identify at least one object and/or detect one gesture that can be correlated to one or more 2D or 3D images projected by the projector assembly 184. As used herein, a "gesture" may include identifiable movements of objects, such as hand, fingers, styli, and the like that are predetermined to or dynamically determined to interact with or otherwise manipulate one or more images rendered by the device 150 on display 152 or using projector assembly 184 based on image data.

Figure 8B:
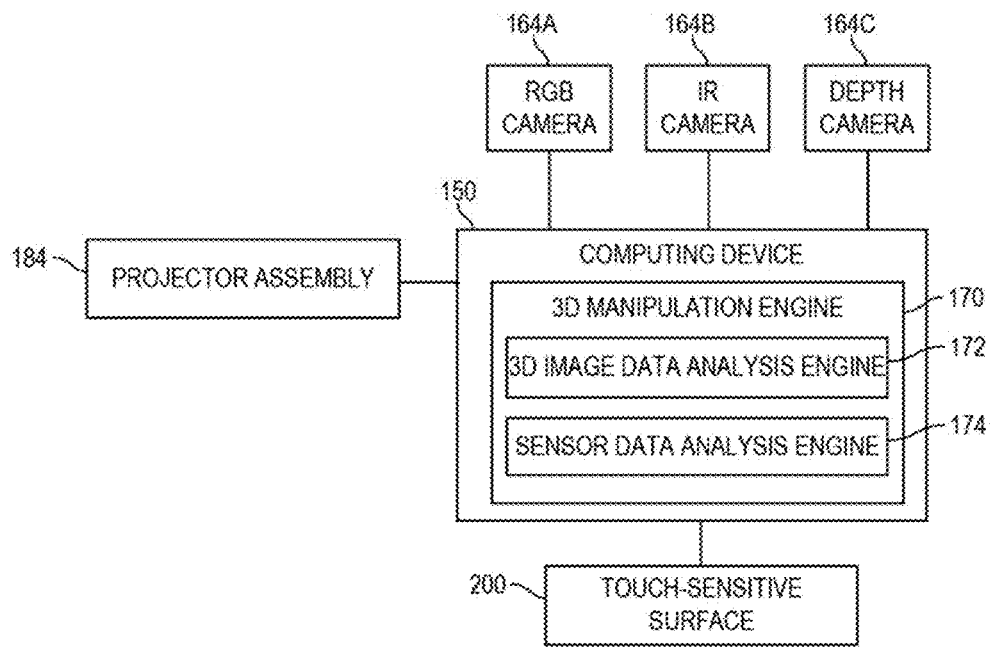
FIG. 8B is a block diagram of an example computing device to manipulate 3D images based on user gestures.

As described above, computing system 100 may comprise a plurality of different types of cameras in sensor bundle 164. In some examples, computing system 100 may utilize the cameras of different types to capture a plurality of images, each representing an object disposed between touch-sensitive surface 200 and the respective camera used to capture the image. In some examples, each of the plurality of cameras may be a one of an RGB camera 164A, an IR camera 164B, a depth camera 164C, gesture camera, or some other type of camera. For example, as shown in FIG. 8B, computing system 100 may comprise computing device 150 communicatively connected to each of RGB camera 164A, IR camera 164B, depth camera 1840, and touch-sensitive surface 200. in such examples, each of cameras 164A-164C may be pointed at surface 200 and may capture a respective image representing an object disposed between the respective camera and surface 200.

Figure 9:
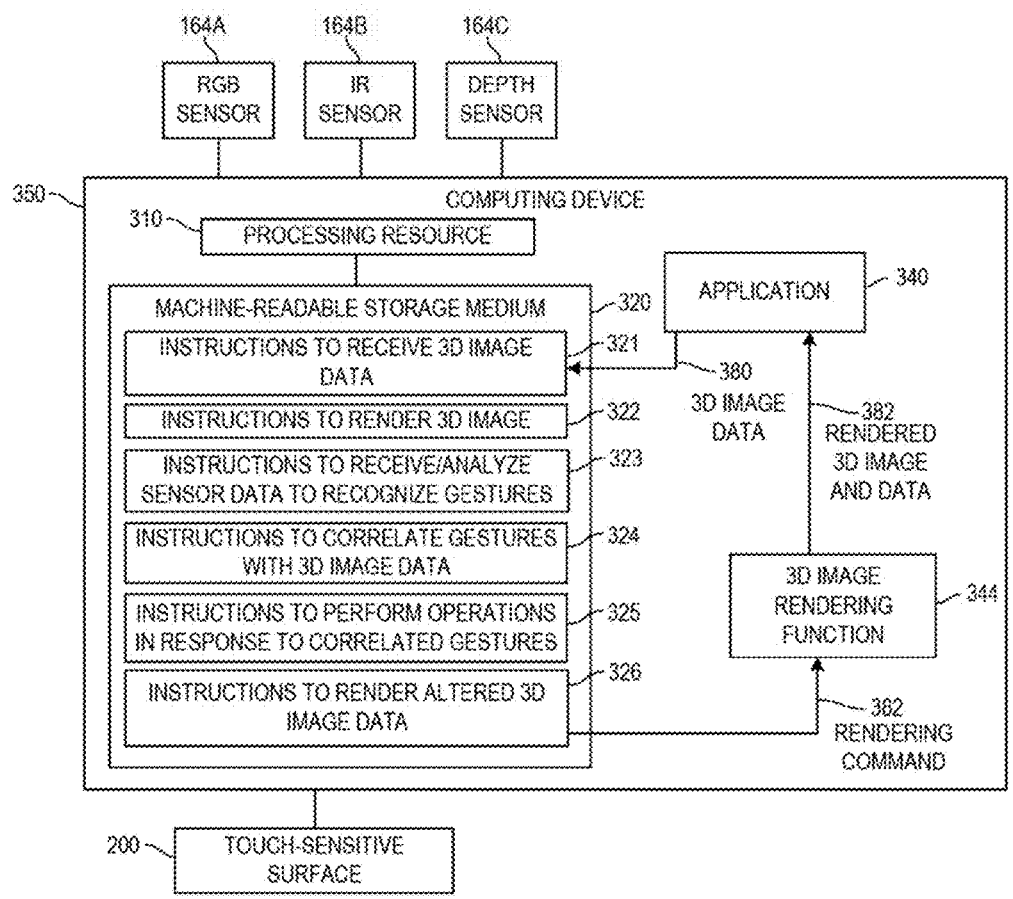
FIG. 9 is a dataflow in an example implementation for manipulating 3D images based on user gestures.

FIG. 9 is a block diagram of another example computing device 350 to recognize gestures to interact with and manipulate 3D images. Computing device 350 may be another example implementation of device 150 described above in relation to FIGS. 1-8. In the example of FIG. 9, computing device 350 can be communicatively connected to touch-sensitive surface 200 and cameras 164A-164C. Each of cameras 164A-164C may be disposed above and pointed at surface 200. Computing device 350 may further include a processing resource 310 and a machine-readable storage medium 320 comprising (e.g., encoded with) instructions 321-326. In some examples, storage medium 320 may include additional instructions, In other examples, instructions 321-326 and any other instructions described herein in relation to storage medium 320, may be stored on a machine-readable storage medium remote from but accessible to computing device 350 and processing resource 310. Processing resource 310 may fetch, decode, and execute instructions stored on storage medium 320 to implement the functionalities described herein. In other examples, the functionalities of any of the instructions of storage medium 320 may be implemented in the form of electronic circuitry, in the form of executable instructions encoded on a machine-readable storage medium, or a combination thereof, Machine-readable storage medium 320 may be a non-transitory machine-readable storage medium.

In the example of FIG. 9, instructions 321 may receive or otherwise acquire 3D image data. The 3D image data can be retrieved from the storage medium 320 or some other storage medium or receive the 3D image data directly from one or more of cameras 184A-164C or from another application 340. Instructions 322 may render an image of a 3D object based on the 3D image data and display the 3D image on display 152 or project it on touch-sensitive surface 200 using the projector assembly 164. Instructions 323 receive and/or analyze sensor data from one or more of cameras 164A-164C to recognize gestures. Instructions 324 correlate recognized gestures with information in the 3D data. In particular, instructions 324 may correlate a recognized gesture with a particular function based on the proximity or distance of the recognized gesture to the apparent location of one or more 3D images, as defined by the 3D image data.

For example, the recognized gestures can be identified as a particular motion gesture that includes movement of hand 35 and/or the individual components of the hand (e.g., fingers, palm, etc.). The recognized gesture may be associated with a particular identifier or function identifier. In some examples, the identifier associated with the recognized gesture may have a global meaning regardless of where in the region between the sensor bundle 164 and the touch-sensitive surface 200 it was detected. In other examples, the location in which the gesture is recognized may determine which function or function identifier is indicated or performed. In such examples, the location at which the gesture is recognized may be independent of the 3D images being rendered. For instance, a swipe of an open-palm hand 35 near the sensor bundle 164 may be associated with a "refresh" command, while a closed fist swipe of the hand near the surface of the touch-sensitive surface 200 may indicate or be associated with a "save" command. Accordingly, such gestures may be location specific but independent of the 3D image data.

In other examples, the function indicated can be based on not only the location of a recognized gesture within the region between sensor bundle 164 and the touch-sensitive surface 200, it may also depend on the apparent location of 3D images in that same region as viewed by a user, as described above. In such examples, the apparent location of the 3D images in the region between sensor bundle 164 and the touch-sensitive surface 200 may be indicated by the current state of the corresponding 3D image data. Such 3D image data can include information as to the location, orientation, and magnification, at which a particular 3D image is currently, or can potentially, be rendered on the display 152 or by projector assembly 184. For example, when a particular gesture, such as a full open-hand swipe, is recognized in a location or region associated with a particular 3D image in the 3D image data, it can indicate a function (e.g. a delete function) that is different than if the same gesture is recognized in a location or region not associated with the particular 3D image. In some examples, any gesture-function association can be context specific. Accordingly, a gesture-function association can depend on the specific location, the specific 3D image, and/or the specific user making the gesture, as well as any other contextual indicators (e.g., time, date, computer system, user preferences, learned gestures, etc.). Any gesture-function association can define a particular gesture scenario.

As used herein, a "gesture recognition scenario" is a mode for providing gesture based user input to a computing system via a one or more sensors of the computing system. In examples described herein, gesture recognition scenarios are different if a computing system is to handle gesture recognition differently for each of the gesture recognition scenarios (which may also be referred to herein as "distinct" gesture recognition scenarios). In some examples, the plurality of different gesture recognition scenarios for computing system 100 may include, for example, a one-handed gestures scenario, a two-handed-gesture scenario, a stylus gesture scenario, an object gesture scenario, and a finger or fingers gesture scenario, as described below. Each such gesture recognition scenario and the resulting functionality can be dependent on the location, 3D image data, and/or the user.

Each gesture recognition scenario can be different and result in a particular functionality or operator being identified to be performed. Accordingly, instructions 325 can perform operations in response to the correlated gestures. For example, initiating operations can include generating a command or a function call associated with the function indicated by the recognized gesture and the context in which is recognized. In some embodiments, the command or function call can include information that identifies a target 3D image and/or the corresponding 3D image data (e.g., an image data file name or object identifier).

Instructions 326 can cause the device 350 or processing resource 310 to render the altered 3D image data or to send the function call with the altered 3D image data to a 3D image rendering function 344 or some other application 340. In some examples, sending the command issued according to instructions 326 can include sending command 382 to the 3D image rendering function 344, which may be a component of the application 340 or an operating system of the computing device 350. Accordingly, the rendering command 382 may include indications of specific image data and one or more functions or operations that are to be performed on the image data while or before it is rendered as an image. For example, the rendering command 382 may identify a particular 3D image data file associated with a 3D house projected so as to appear in the lower right quadrant of the region between the sensor bundle 184 and the touch-sensitive surface 200. In addition to the identification of the 3D image data file associated with the 3D house, the rendering command 382 may include identification of a magnification function and a centering function that is to be performed such that the 3D image of the house is enlarged and centered in the region between the sensor bundle 184 and the touch-sensitive surface 200 so that the user can see more detail.

Once the 3D image rendering function 344 processes the rendering command 382, it can generate the rendered 3D image and data and provide it to one more applications 340 or the operating system so that it can be sent to the projector assembly 184 and/or display 152 to be displayed to a user.

Figure 10:
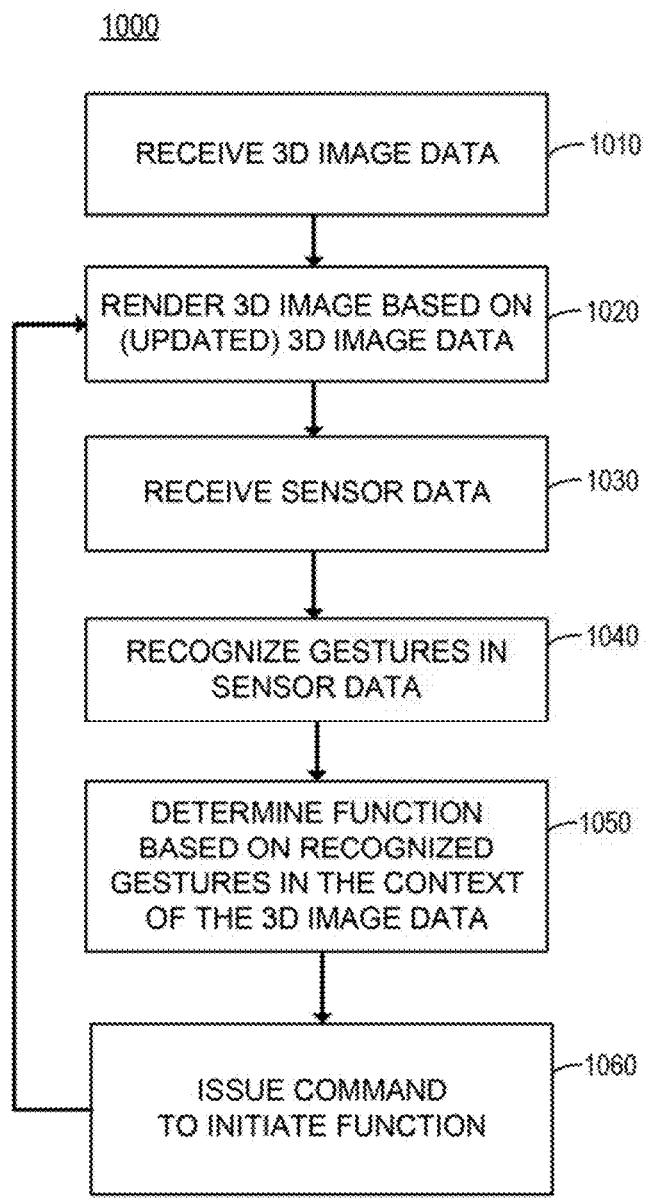
FIG. 10 is a flowchart of an example method for manipulating 3D images based on user gestures.

FIG. 10 is a flowchart of an example method 1000 for interacting with or manipulating 3D image data using gesture based commands in system 100 with 3D display capabilities. Although execution of method 1000 is described below with reference to computing device 150 of FIGS. 1-8 and 9, other suitable systems for execution of method 1000 can be utilized (e.g., system 100 with computing device 350). Additionally, implementation of method 1000 is not limited to such examples.

At box 1010 of method 1000, the computer system 100 can receive 3D image data from one or more sources. In one example, the 3D data can include image data from a previously generated and saved image data file and/or image data detected by one or more cameras in the sensor bundle 164. As described herein, the 3D image data can include information that can be used by the computer system 100 to render a corresponding image using a display 152 or projector assembly 184 using one or more 3D display techniques so that the image appears to occupy a specific location of the space between the sensor bundle 164 and touch-sensitive surface 200, at box 1020.

At box 1030, the computing device 150, or some component thereof, can receive sensor data from one or more cameras in sensor bundle 164. The sensor data can include any combination of color, IR, and/or distance data related to the presence, location, and/or motion of a user gesture in the space between the sensor bundle 164 and touch-sensitive surface 200.

At box 1040, the computing device 150 can recognize gestures in the sensor data, In some examples. the sensor data can include frames of image data organized in temporal sequences. Such image data can include images in the visible, IR, UV, and other wide and narrow bands of the electromagnetic spectrum. The computing device can compare the incremental differences between frames in the image data to discern movement of objects, such as hand, arm, finger gestures, and the like. The computing device 150 can then use the movement of objects to recognize gestures. In some examples, the sensor data can include location data. Such location data can include one or more coordinates that define the locations of a detected object in the field of view of the sensor bundle 164. The computing device 150 can analyze the changes in the location data to determine the 3D directionality of a recognized gesture. Accordingly, information regarding a recognized gesture may include a definition of a motion as well as a definition of 3D locations in which the gesture is detected, as described above.

At box 1050, the computing device 150 can determine a command based on the information about the recognized gesture in the context of the 3D image data. Accordingly, when a gestured in recognized near a particular object defined in the 3D image data the associated command may be to initiate one function, while the same gesture recognized near another object may be associated with another function. In some examples, each recognizable gesture may indicate a particular function that can depend on the location and 3D image context in which it is recognized. Thus, each function or operator for interacting with or manipulating one or more aspects of the 3D image provided by the computing device 150 can be associated with a set of information that can include a gesture identifier, a location, and/or an object identifier.

At box 1060, the computing device 150 can issue a command to one or more other devices to initiate the function associated with the recognized gesture. For example, the functionality of 3D manipulation engine 170 can be activated to alter or update the underlying 3D image data and then to issue appropriate commands to render/update the updated 3D image using the projector assembly 184, at box 1020. As indicated in FIG. 10, boxes 1020 through 1060 can be repeated as necessary to handle real-time or near real-time changes to 3D images in response to continued cognition of gestures that indicate specific functions to interaction with or manipulation the 3D images.

Although the flowchart of FIG. 10 shows a specific order of performance of certain functionalities, method 1000 is not limited to that order. For example, the functionalities shown in succession in the flowchart may be performed in a different order, may be executed concurrently or with partial concurrence, or a combination thereof. In some examples, features and functionalities described herein in relation to FIG. 10 may be provided in combination with features and functionalities described herein in relation to any of FIGS. 1-9.

These and other variations, modifications, additions, and improvements may fall within the scope of the appended claims(s). As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

What is claimed is:

1. A computing system comprising:
   a projector assembly to project three-dimensional images corresponding to three-dimensional image data onto a surface;
   a sensor, pointed at the surface, to capture a three-dimensional scan of a physical object on the surface, wherein the three-dimensional images are based on the three-dimensional scan of the physical object and to generate sensor data of motion of an object detected in a region between the sensor and the surface; and
   a 3D image manipulation engine to recognize gestures based on the sensor data and to determine functions to perform on the three-dimensional images based on the gestures and context defined in the three-dimensional image data, wherein the context comprises a distance threshold to a location of the three-dimensional images such that a same gesture may be associated with different functions, wherein a first function of the different functions is associated with the same gesture at a first distance less than the distance threshold and a second function of the different functions is associated with the same gesture at a second distance greater than the distance threshold, wherein the first function is to manipulate the three-dimensional image and the second function is to operate a three dimensional user interface control elements that appear to be displayed in a space about the surface.

2. The computing system of claim 1, wherein the sensor data comprises coordinates corresponding to a location at which the motion is detected between the sensor and the surface.

3. The computing system of claim 1, wherein the context comprises information corresponding to locations of the three-dimensional images projected in the region between the sensor and the surface.

4. The computing system of claim 3, wherein the three-dimensional images comprise user interface control elements and images that represent three-dimensional objects captured by the sensor.

5. The computing system of claim 4, wherein the sensor comprises a color camera, an infrared camera, and a depth camera.

6. The computing system of claim 1, wherein the 3D image manipulation engine further determines a user identifier based on the sensor data, wherein to determine the functions to perform is further based on the user identifier.

7. The computing system of claim 1, wherein the object is a hand, the gestures comprises hand gestures, the surface comprises a touch-sensitive surface, and the sensor data further comprises touch-input corresponding to the hand touching the touch-sensitive surface.

8. A non-transitory machine-readable storage medium comprising instructions executable by a processing resource of a computing system comprising a projector assembly pointed at a touch-sensitive surface and a sensor disposed above and pointed at the touch-sensitive surface, the instructions executable to:

receive three-dimensional image data associated with a three-dimensional scan of a physical object on the touch-sensitive surface that is captured by the sensor, wherein the three-dimensional image data is based on the three-dimensional scan of the physical object;

render three-dimensional images corresponding to the three-dimensional image data using the projector assembly, wherein the three-dimensional images appear to occupy a three-dimensional region between the sensor and the touch-sensitive surface;

receive sensor data from the sensor corresponding to motion of an object detected in the three-dimensional region between the sensor and the touch-sensitive surface;

recognize gestures based on the sensor data; and correlate recognized gestures with the three-dimensional image data; and determine an operation to alter the three-dimensional image data based on the recognized gestures, context defined in the three-dimensional images, and three-dimensional image data that are correlated, wherein the context comprises a distance threshold to a location of the three-dimensional image data such that a same gesture may be associated with different functions, wherein a first function of the different functions is associated with the same gesture at a first distance less than the distance threshold and a second function of the different functions is associated with the same gesture at a second distance greater than the distance threshold, wherein the first function is to manipulate the three-dimensional image and the second function is to operate a three dimensional user interface control elements that appear to be displayed in a space about the surface.

9. The storage medium of claim 8, further comprising instructions executable to:

perform the operation on the three-dimensional image data to generate altered three-dimensional image data; and render updated three-dimensional images based on the altered three-dimensional image data using the projector assembly.

10. The storage medium of claim 8, wherein the instructions to receive the three-dimensional image data comprise instructions to capture three-dimensional image data using the sensor assembly.

11. The storage medium of claim 8, wherein the instructions to receive the three-dimensional image data comprise instructions to receive the three-dimensional image data from an application executed on the processing resource.

12. The storage medium of claim 8, wherein the instructions to receive the three-dimensional image data comprise instructions to retrieve the three-dimensional image data from a data store of previously determined image data.

13. A processor-implemented method comprising:

rendering three-dimensional images based on three-dimensional image data associated with a three-dimensional scan of a physical object on the touch-sensitive surface that is captured by the sensor, wherein the three-dimensional image data is based on the three-dimensional scan of the physical object;

receiving sensor data corresponding to a user gesture;

recognizing the user gesture based on the sensor data;

determining a function based on the recognized user gesture, context defined in the three-dimensional images, and the three-dimensional image data, wherein the context comprises a distance threshold to a location of the three-dimensional image data such that a same gesture may be associated with different functions, wherein a first function of the different functions is associated with the same gesture at a first distance less than the distance threshold and a second function of the different functions is associated with the same gesture at a second distance greater than the distance threshold, wherein the first function is to manipulate the three-dimensional image and the second function is to operate a three dimensional user interface control elements that appear to be displayed in a space about the surface; and initiating the function to update the three-dimensional image data.

14. The method of claim 13, wherein the three-dimensional image data comprises object location information corresponding to objects represented in the three-dimensional images, the sensor data comprises user gesture location information corresponding to the user gesture, and determining the function is further based on a correlation between the object location information and the user gesture location information.

15. The method of claim 13, further comprising scanning an object using a sensor to generate the three-dimensional image data.

* * * * *

UNITED STATES PATENT AND TRADEMARK OFFICE
CERTIFICATE OF CORRECTION

PATENT NO. : 10,268,277 B2
APPLICATION NO. : 15/514645
DATED : April 23, 2019
INVENTOR(S) : Jinman Kang et al.

Page 1 of 1

It is certified that error appears in the above-identified patent and that said Letters Patent is hereby corrected as shown below:

On the Title Page

In Column 2, item (57), Abstract, Line 2, delete "image" and insert -- images --, therefor.

In Column 2, item (57), Abstract, Line 6, delete "data" and insert -- data. --, therefor.

Signed and Sealed this
Thirteenth Day of August, 2019

Andrei Iancu
*Director of the United States Patent and Trademark Office*